US012078488B2

(12) United States Patent
Newman et al.

(10) Patent No.: US 12,078,488 B2
(45) Date of Patent: Sep. 3, 2024

(54) MAPPING AND TRACKING METHODS AND SYSTEMS PRINCIPALLY FOR USE IN CONNECTION WITH SWIMMING POOLS AND SPAS

(71) Applicant: ZODIAC POOL SYSTEMS LLC, Carlsbad, CA (US)

(72) Inventors: Phillip Newman, Howick (ZA); Abian van der Meijden, Midrand (ZA); Hendrikus Johannes van der Meijden, Midrand (ZA)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 0 days.

(21) Appl. No.: 17/982,462

(22) Filed: Nov. 7, 2022

(65) Prior Publication Data

US 2023/0065678 A1 Mar. 2, 2023

Related U.S. Application Data

(63) Continuation of application No. 16/541,104, filed on Aug. 14, 2019, now Pat. No. 11,519,732.

(60) Provisional application No. 62/719,867, filed on Aug. 20, 2018.

(51) Int. Cl.
| | |
|---|---|
| *G01C 21/20* | (2006.01) |
| *E04H 4/16* | (2006.01) |
| *G01S 17/42* | (2006.01) |
| *G01S 17/86* | (2020.01) |

(52) U.S. Cl.
CPC ............ *G01C 21/20* (2013.01); *E04H 4/1654* (2013.01); *G01S 17/42* (2013.01); *G01S 17/86* (2020.01)

(58) Field of Classification Search
CPC ....... G01C 21/20; E04H 4/1654; G01S 17/42; G01S 17/86
See application file for complete search history.

(56) References Cited

U.S. PATENT DOCUMENTS

| | | | |
|---|---|---|---|
| 4,290,043 A | 9/1981 | Kaplan | |
| 10,831,211 B1* | 11/2020 | Desai | ............ G05D 1/0274 |
| 11,519,732 B2 | 12/2022 | Newman et al. | |
| 2006/0179934 A1 | 8/2006 | Smith et al. | |
| 2008/0084318 A1* | 4/2008 | Fogelson | ............ G08B 21/082 |
| | | | 340/573.6 |

(Continued)

FOREIGN PATENT DOCUMENTS

| | | |
|---|---|---|
| CN | 108387234 | 8/2018 |
| DE | 102007053310 | 6/2009 |

(Continued)

OTHER PUBLICATIONS

"Autonomous inspection using an underwater 3D LiDAR" published by McLeod et al. in Oceans—San Diego (Year: 2013).*

(Continued)

*Primary Examiner* — Rodney A Butler
(74) *Attorney, Agent, or Firm* — Kilpatrick Townsend & Stockton LLP

(57) ABSTRACT

Cleaning of a swimming pool may be facilitated by systems and methods for mapping a pool environment. Such mapping may occur in three dimensions when appropriate. At least some of the systems may include an apparatus for light detection and ranging (LIDAR) tethered to an automatic swimming pool cleaner.

17 Claims, 5 Drawing Sheets

(56) References Cited

U.S. PATENT DOCUMENTS

| | | | |
|---|---|---|---|
| 2014/0009748 A1 | | 1/2014 | Leonessa et al. |
| 2014/0085613 A1* | | 3/2014 | Doyle .................. H04N 5/74 353/121 |
| 2015/0078123 A1* | | 3/2015 | Batcheller ............ G01S 15/86 367/7 |
| 2018/0044936 A1* | | 2/2018 | Torem .................. E04H 4/1654 |
| 2018/0266134 A1 | | 9/2018 | Pichon |
| 2019/0098233 A1* | | 3/2019 | Gassend ............. H04N 23/698 |
| 2019/0243379 A1* | | 8/2019 | Attar .................... E04H 4/1654 |
| 2020/0001723 A1 | | 1/2020 | Durvasula et al. |
| 2020/0050215 A1 | | 2/2020 | Kessler et al. |

FOREIGN PATENT DOCUMENTS

| | | |
|---|---|---|
| EP | 1122382 A1 | 8/2001 |
| EP | 2960741 | 12/2015 |
| EP | 3282072 | 2/2018 |
| WO | 2008155178 | 12/2008 |
| WO | 2014004929 | 1/2014 |
| WO | 2018077870 | 5/2018 |

OTHER PUBLICATIONS

European Application No. 19759840.2, Office Action mailed on Nov. 21, 2022, 8 pages.

European Patent Application No. 19759840.2, Office Action mailed Aug. 10, 2022, 3 pages.

International Application No. PCT/US2019/046583, International Search Report and Written Opinion mailed on Nov. 28, 2019, 14 pages.

International Application No. PCT/US2019/046583, International Preliminary Report on Patentability mailed on Mar. 4, 2021, 9 pages.

U.S. Appl. No. 16/541,104, Non-Final Office Action mailed on Oct. 21, 2021, 10 pages.

U.S. Appl. No. 16/541,104, Non-Final Office Action mailed on Feb. 25, 2022, 13 pages.

U.S. Appl. No. 16/541,104, Notice of Allowance mailed on Aug. 10, 2022, 5 pages.

Australian Application No. 2019326321, First Examination Report mailed on Aug. 24, 2023, 4 pages.

Australian Application No. 2019326321, Second Examination Report mailed on Mar. 7, 2024, 4 pages.

* cited by examiner

14

Path traced by floating LIDAR during SLAM in green

MAPPING AND TRACKING METHODS AND SYSTEMS PRINCIPALLY FOR USE IN CONNECTION WITH SWIMMING POOLS AND SPAS

CROSS-REFERENCE TO RELATED APPLICATION

This application is a continuation of U.S. patent application Ser. No. 16/541,104, filed on Aug. 14, 2019, and entitled MAPPING AND TRACKING METHODS AND SYSTEMS PRINCIPALLY FOR USE IN CONNECTION WITH SWIMMING POOLS AND SPAS, which claims the benefit of and priority to U.S. Provisional patent application Ser. No. 62/719,867, filed Aug. 20, 2018, and entitled MAPPING AND TRACKING METHODS AND SYSTEMS PRINCIPALLY FOR USE IN CONNECTION WITH SWIMMING POOLS AND SPAS, both of which are hereby incorporated by reference in their entireties.

FIELD OF THE INVENTION

This invention relates to mapping and tracking systems and more particularly, although not necessarily exclusively, to systems for mapping characteristics of water-containing vessels such as swimming pools or spas and tracking positions of moveable equipment, such as an automatic pool cleaner ("APC"), within the vessels.

BACKGROUND OF THE INVENTION

European Patent Application No. 1122382 of Clementi (the "Clementi Application"), whose entire contents are incorporated herein by this reference, illustrates an APC capable of moving over to-be-cleaned surfaces of a swimming pool. Connected to the APC via a cable is a shuttle incorporating a battery, a microcontroller, and a signal transmitter and receiver. The shuttle, described in the Clementi Application as "a sort of floating 'island,'" floats on the surface of water within a swimming pool and is towed by the APC as the latter moves within the pool.

Absent from the shuttle of the Clementi Application is any capability of tracking location of the mobile APC within the pool. Similarly absent from the shuttle is any ability to track its own position within a pool or to determine any characteristics of the pool itself. Because all of this information is valuable in the context of efficiently and effectively cleaning vessels such as swimming pools and spas, it would be advantageous to develop methods and systems for obtaining some or all of it.

SUMMARY OF THE INVENTION

The present invention provides such methods and systems. In a general sense, the invention facilitates more efficient and cost-effective cleaning of swimming pools by mapping a pool environment in three dimensions, performing path planning for an APC, and assisting in navigating the APC along the planned paths. The APC may have an on-board power source for effecting autonomous movement within a pool as well as a pump to draw debris-laden pool water through a filter for cleaning, although components such as these alternatively may be located remote from the APC.

DETAILED DESCRIPTION

Tethered to the APC 10 (see, e.g., FIGS. 4-5) may be a floating object 14 configured to facilitate mapping and tracking. Advantageously, the tether may be or include a cable configured to convey electronic data between the APC 10 and the floating object 14. The cable additionally may, in some cases, convey electrical power to the APC 10 as well, as advantageously the floating object 14 includes an on-board battery or other source of power both for it and for the APC 10. One presently-preferred tether is a cable approximately 2.4 m in length, although persons skilled in the art will recognize that shorter or longer cables may be used instead. As the APC 10 moves within the pool, it tows the floating object along the water surface.

In some versions of the invention, the floating object 14 may include apparatus for light detection and ranging ("LIDAR"). As known to persons skilled in the relevant art, LIDAR constitutes methods of measuring distance to a target by illuminating the target with pulsed laser light and sensing the reflected pulses with a sensor. Presently preferred is that the LIDAR apparatus have a rotating time of flight ("ToF") ranging sensor projecting above the waterline of the pool (so as to send laser light through air, rather than water) that generally continuously collects data as it scans the walls forming the perimeter of a pool at and above the waterline. An exemplary such sensor rotates at approximately 5 Hz and collects approximately 500-1000 samples of ranging and angular data per cycle. The LIDAR apparatus thus may develop an accurate mapping of the pool perimeter as well as of its position within the perimeter of the pool.

Figure 2:
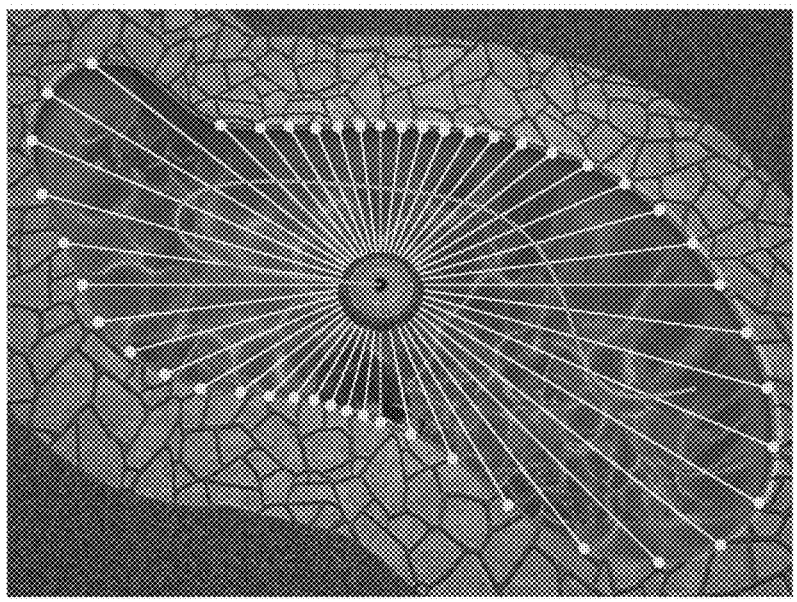
FIG. 2 schematically illustrates exemplary information which may be gleaned by a ranging sensor floating within a swimming pool.

FIG. 2 schematically illustrates exemplary distance and angle information which may be gleaned by rotating through 360° a ToF ranging sensor floating within a pool. Because rotation of the sensor through one revolution is materially faster than an APC 10 typically travels within a pool, linear movement of the tethered APC 10 either may be ignored or accounted for when obtaining distance and angle information for a particular cycle. In some versions of the invention, conventional techniques of simultaneous localization and mapping ("SLAM") may be employed in processing data obtained by the ToF ranging sensor of the LIDAR apparatus.

The floating object 14 additionally may include a camera 18 (see FIG. 3) configured to record images of the APC 10 to which the object 14 is tethered. Advantageously, the camera 18 may have a "fish-eye" type of lens whose fields of view ("FOV") both horizontally and vertically are 180° (or approximately so). Similarly advantageously, the camera 18 is integrated into or attached to the floating object 14 facing downward into the water of the pool. The camera 18 is configured to record the underwater scene with the APC 10 constantly in view, which is possible due to the relatively short length of the cable. Conventional techniques of visual simultaneous localization and mapping ("VSLAM") may be utilized to process its image data.

Figure 4:
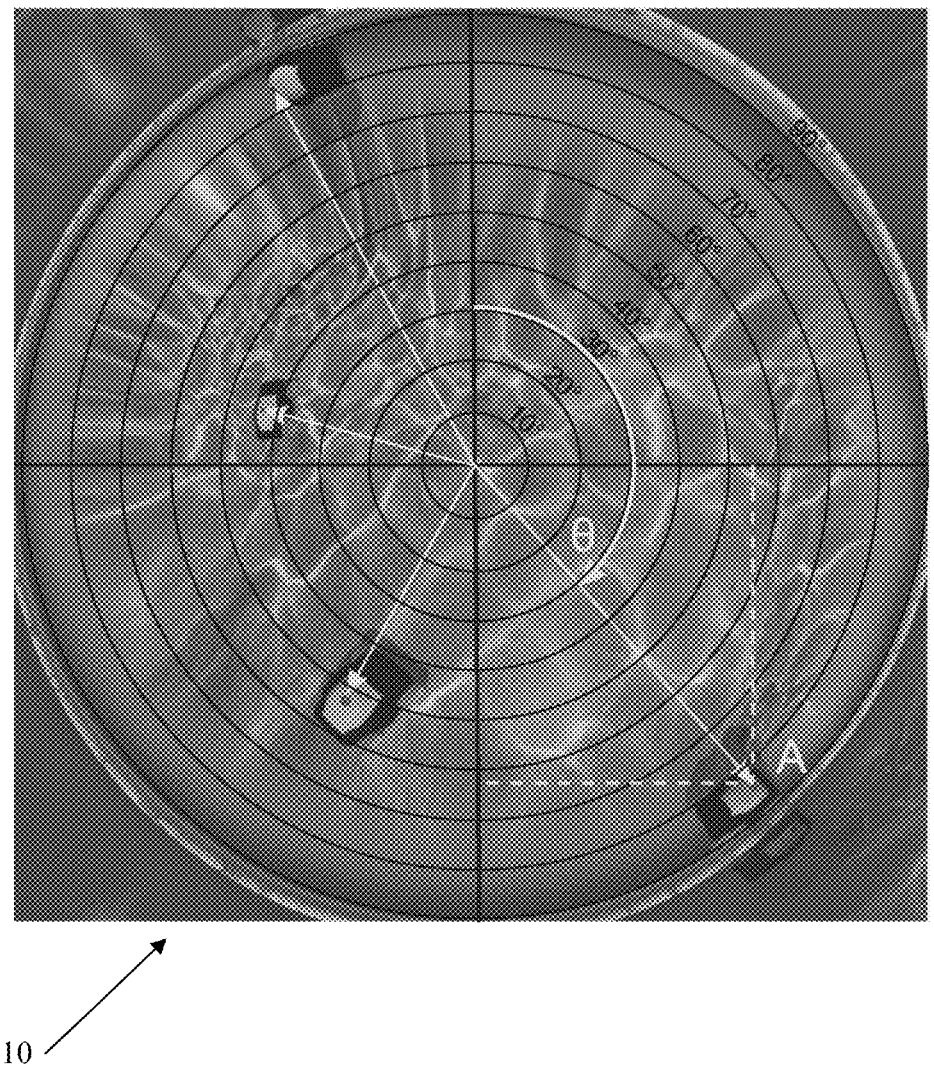
FIG. 4 schematically illustrates exemplary positions of an APC relative to the camera of FIG. 3.

In particular, the APC 10 may include any suitable marker (e.g., a red dot) on its body that the camera 18 may track continuously in its video frame. Preferably the marker is located on a top, central portion of the body, although it may be located elsewhere instead. The position of the marker as tracked through the camera 18 (by associated hardware or software, or both) may provide information as to the heading and pitch of the APC 10 relative to the LIDAR apparatus, samples of which are schematically depicted in FIG. 4. Collectively, the LIDAR apparatus and camera 18 supply information sufficient to determine various dimensions and contours of the pool in which the object 14 is floating as well as certain information respecting locations of the APC 10 (in "x" and "y" coordinates) and the floating object 14 itself.

In some embodiments of the invention, the APC 10 includes a depth sensor configured to supply additional information (a "z" coordinate) as to its position within a pool. By utilizing depth information together with information as to marker heading and pitch angle, a three-dimensional estimate of the APC's position relative to the LIDAR apparatus may be obtained (see FIG. 5). And because the position of the LIDAR apparatus within the pool relative to the pool walls is known via the ToF ranging sensor, an accurate determination of the location of the APC 10 within the pool may be made.

Yet additionally, the APC 10 may include an inertial measurement unit or other device configured to provide information as to how the APC 10 is tilted. Considered altogether, therefore, information gathered by the floating object 14 may supply accurate estimates of position and orientation of the APC 10 excluding its azimuth direction. Although the absolute direction the APC 10 is facing is not necessarily known if the APC 10 is stationary, such direction becomes apparent as soon as the APC 10 moves forward or backward from a particular position. Alternatively, azimuth direction could be set by use of a second marker located on the APC 10 at a distance from the other marker. Accordingly, at this point all relevant absolute position and orientation estimates may be obtained for the APC 10 relative to the pool, allowing precise pool mapping, path planning, and navigation. Any or all of this information, further, may be recorded and displayed in any suitable manner for evaluation by a pool user, pool equipment technician or manufacturer, or otherwise.

Moreover, the floating object 14 may perform some or all of the functions attributed to the shuttle of the Clementi Application. It thus may, if desired, include any or all of at least one battery, controller (including processing capabilities), and signal transmitter and receiver. The floating object 14 further could include components such as solar panels for charging the battery, for example.

Exemplary concepts or combinations of features of the invention may include:
A. A method of mapping a pool using a device floating on water within the swimming pool.
B. A method of mapping a swimming pool using a LIDAR apparatus.
C. A method of cleaning a swimming pool comprising (i) obtaining information from a sensor of a LIDAR apparatus and a camera positioned within the pool, (ii) processing the obtained information, and (iii) conveying navigation information via a cable to an APC travelling along a surface of the pool.
D. A cleaning system comprising: (i) a floating object comprising a LIDAR apparatus, (ii) an APC, and (iii) a cable connecting the LIDAR apparatus and the APC both mechanically and electronically.

These examples are not intended to be mutually exclusive, exhaustive, or restrictive in any way, and the invention is not limited to these exemplary embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

Figure 1:
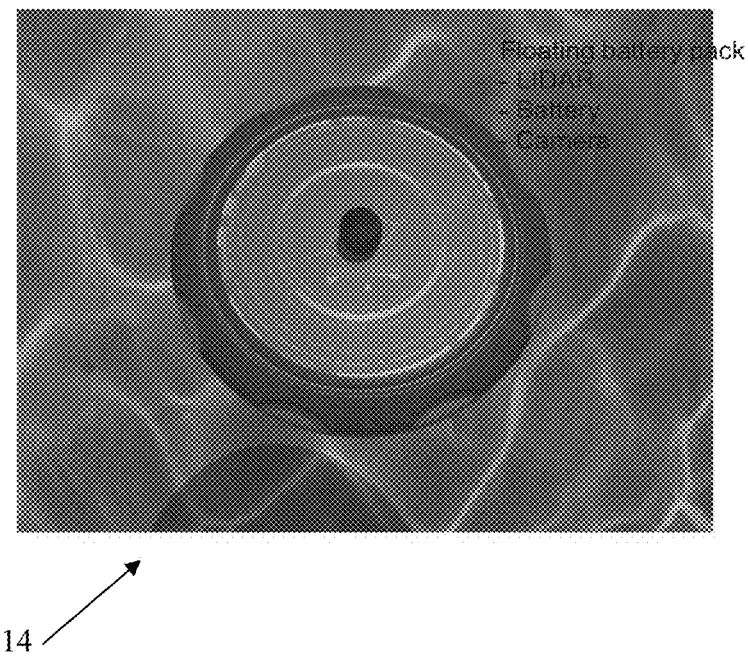
FIG. 1 illustrates an exemplary floating object configured to facilitate mapping and tracking in connection with the present invention.
Figure 3:
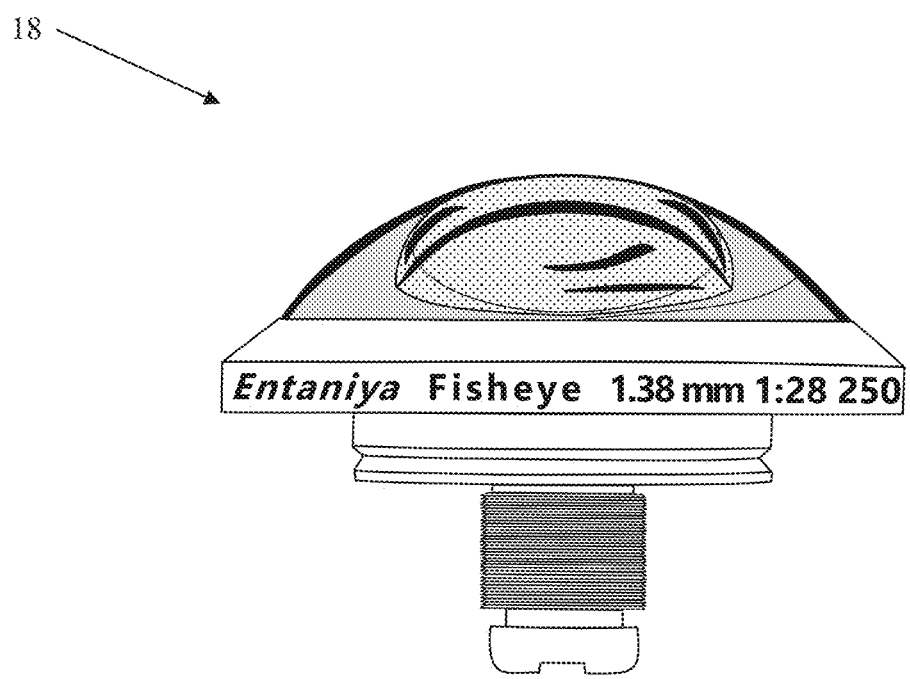
FIG. 3 illustrates an exemplary camera that may be used in connection with the floating object of FIG. 1.
Figure 5:
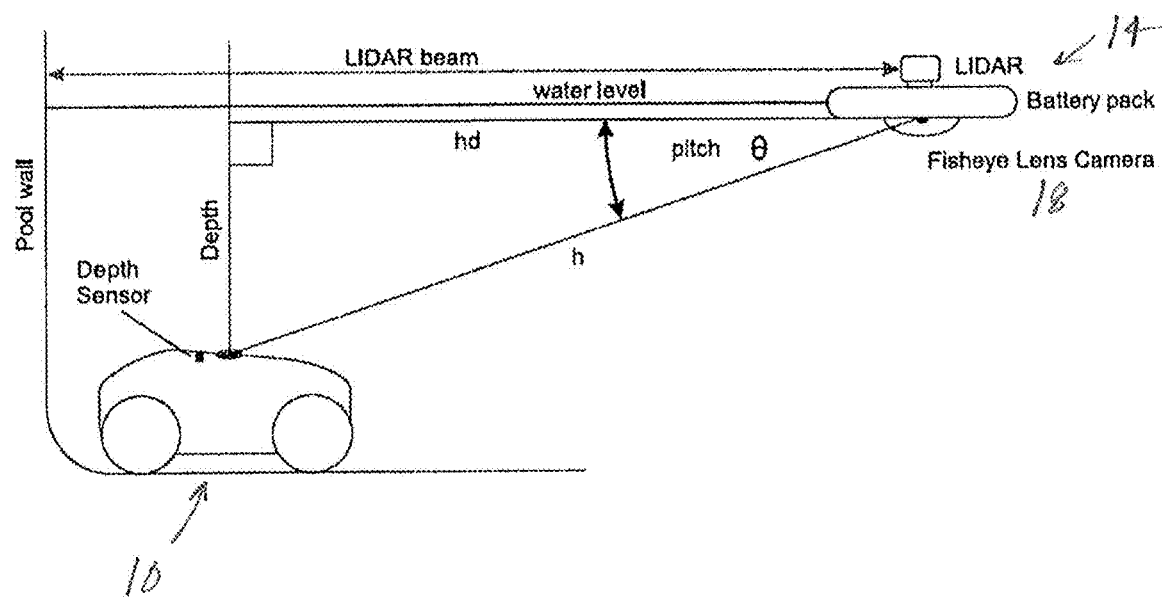
FIG. 5 diagrammatically illustrates development of a three-dimension estimate of a position of an APC relative to the floating object of FIG. 1.

Included in connection with the figures of the Provisional Application was at least the following text:
FIG. 1: Floating battery pack
LIDAR
Battery
Camera
FIG. 2: Basic SLAM (simultaneous localization and mapping) is continuously performed to establish the position and rotation of the floating LIDAR at any time. The rotational reference of the LIDAR is known relative to the first data sample at each 360° scan. Thus if the LIDAR is rotated in the pool, the rotation of the LIDAR base is also known relative to its starting rotation as long as SLAM calculations are ongoing.
FIG. 3: Camera (180° FOV)
Attached to the floating LIDAR is a camera facing straight down which has a fish-eye lens with a horizontal and vertical field of view of 180°.
The camera records the underwater scene with the pool cleaner constantly in view. This is almost guaranteed because of its relatively short cable. There is a tracking marker on top and more or less on the center of the cleaner that is tracked continuously in the video frame. The position of the marker on the screen gives us the relative heading and pitch of the cleaner to the floating LIDAR.
FIG. 4: Image showing various cleaner positions relative to the camera providing heading and pitch relative to the screen center.
FIG. 5: The pool cleaner has a depth sensor. The depth information is applied to the marker heading and pitch angles which then gives us a 3 dimensional estimate relative to the floating LIDAR which in turn has an absolute reference to the pool outline (real world). This gives us an accurate estimate of where the pool cleaner is in the pool at any given point in time. Coupled to that the cleaner also has an IMU (inertial measurement unit) that provides tilt information. The above mentioned solution thus provides us with an accurate cleaner position and orientation estimation excluding its azimuth direction. The absolute direction that the pool cleaner is facing is not known if it is stationary but soon becomes apparent when it moves forward or backward from a previous position. Thus the solution finally provides an absolute position and orientation estimate relative to the pool. The above is sufficient for pool mapping, path planning and navigation.

Given a certain pitch angle $\theta$ and a depth one can determine h as well as hd horizontal distance from the LIDAR unit. Heading is also provided from the tracked marker in each camera frame.

Further, although applicant has described devices and techniques for use principally with swimming pools, persons skilled in the relevant field will recognize that the present invention may be employed in connection with other objects and in other manners. Variants of the invention, moreover, allow for use of one or more cameras on the top of the floating object in addition to (or instead of) the LIDAR apparatus to track fixed-location objects outside the pool as well as aid in mapping the pool perimeter. These fixed-location objects could then serve as reference points for assessing the location of the floating object.

Other variants contemplate use of a more complex range of markers or fiducials placed on the APC and which are visible to the camera to allow determination, through image processing, of such things as direction and bank, pitch and roll angles. Yet alternatively, a camera may be placed on the APC to capture images of the floating island, to whose bottom surface one or more markers or fiducials have been attached, again facilitating determination of the relative positions of the APC and floating object. Furthermore, the camera and LIDAR apparatus may, if desired, be mounted on a weighted gimbal for image stability by assuring a much better vertical axis. The floating buoy may encounter some ripples or waves which may otherwise cause errors in accuracy of the readings taken by both the camera and the LIDAR apparatus, hence benefitting from the weighted gimbal mounting. Finally, references to "pools" and "swimming pools" herein may also refer to spas or other water-containing vessels used for recreation or therapy and for which mapping or tracking is needed or desired.

What is claimed is:

1. A cleaning system comprising: (a) an automatic pool cleaner and (b) a floating object associated with the automatic pool cleaner, wherein the floating object comprises a LIDAR apparatus and an on-board power source, wherein the floating object is electrically connected to the automatic pool cleaner such that power form the on-board power source may be conveyed to the automatic pool cleaner, and wherein the LIDAR apparatus is movable within a swimming pool.

2. The cleaning system of claim 1, wherein the LIDAR apparatus is tethered to the automatic pool cleaner.

3. The cleaning system of claim 1, further comprising a controller configured to receive information from the LIDAR apparatus and provide information to the automatic pool cleaner based on the received information the LIDAR apparatus.

4. The cleaning system of claim 3, wherein the controller is configured to map a swimming pool using the information from the LIDAR apparatus, and wherein the controller is configured to provide navigation information to the automatic pool cleaner.

5. The cleaning system of claim 1, wherein the LIDAR apparatus is both mechanically and electronically connected to the automatic pool cleaner.

6. The cleaning system according to claim 1, wherein the floating object further comprises a camera.

7. The cleaning system according to claim 1, wherein the LIDAR apparatus comprises a rotating ranging sensor projecting above a waterline of a swimming pool.

8. A cleaning system comprising: (a) an automatic pool cleaner and (b) a LIDAR apparatus with a sensor and positionable within a perimeter of a swimming pool and movable within the swimming pool, wherein information obtained from the sensor of the LIDAR apparatus is provided to the automatic pool cleaner, wherein the cleaning system further comprises a floating object, wherein the floating object comprises the LIDAR apparatus projecting above a waterline, wherein the floating object further comprises a camera, and wherein the camera faces downward into the swimming pool when the floating object is floating in the swimming pool.

9. The cleaning system of claim 8 in which the automatic pool cleaner comprises a marker which the camera is configured to track.

10. The cleaning system of claim 8, wherein the LIDAR apparatus is tethered to the automatic pool cleaner.

11. The cleaning system of claim 8 in which the automatic pool cleaner further comprises at least one of a depth sensor or a tilt sensor.

12. The cleaning system of claim 8, further comprising a controller configured to receive the information from the LIDAR apparatus and provide the information to the automatic pool cleaner.

13. A cleaning system comprising: (a) an automatic pool cleaner and (b) a LIDAR apparatus positionable within a perimeter of a swimming pool and movable within the swimming pool, wherein the cleaning system is configured to map the swimming pool using information from the LIDAR apparatus and to provide navigation information based on the mapping of the swimming pool to the automatic pool cleaner.

14. The cleaning system of claim 13, further comprising a floating object, wherein the floating object comprises the LIDAR apparatus.

15. The cleaning system of claim 13, wherein the LIDAR apparatus is tethered to the automatic pool cleaner.

16. The cleaning system of claim 13, further comprising a controller remote from the automatic pool cleaner.

17. The cleaning system of claim 16, further comprising a floating object comprising a battery, wherein the controller is on the floating object.

* * * * *